United States Patent [19]

Thorn

[11] 4,319,303

[45] Mar. 9, 1982

[54] INHIBITION OF CHARGE ACCUMULATION

[75] Inventor: John E. Thorn, Plymouth, Mich.

[73] Assignee: Ford Motor Company, Dearborn, Mich.

[21] Appl. No.: 193,243

[22] Filed: Oct. 2, 1980

[51] Int. Cl.³ .............................................. H05F 3/00
[52] U.S. Cl. ..................................... 361/215; 361/216
[58] Field of Search ................................ 361/215, 216

[56] References Cited

U.S. PATENT DOCUMENTS

| | | | |
|---|---|---|---|
| 2,053,114 | 9/1936 | Sinks | 361/215 |
| 3,619,718 | 11/1971 | Leonard | 361/215 |
| 4,005,339 | 1/1977 | Plantard | 361/215 |
| 4,215,384 | 7/1980 | Elson | 361/215 |

FOREIGN PATENT DOCUMENTS 687679 2/1953 United Kingdom ................ 361/215

OTHER PUBLICATIONS

Ginsburgh, I., "The Static Charge Reducer", *Journal of Colloid and Interface Science*, vol. 32, No. 3, Mar. 1970, pp. 424–432.
"Vestamid, Polyamide 12" Catalog, 1979 Edition.

*Primary Examiner*—J. D. Miller
*Assistant Examiner*—L. C. Schroeder
*Attorney, Agent, or Firm*—Peter D. McDermott; Roger L. May

[57] ABSTRACT

Charge accumulation inhibitor (100) in FIG. 2 of fuel filler pipe (200) prevents an accumulation of a portion of electrical charge that a conductor such as cap flange retainer (302) or a fuel dispending metallic spout may otherwise, in absence of inhibitor 100 or grounding of the spout, acquire. Inhibitor (100) is made of semi conductive material such as a nylon 12 filled with conductive particulate to yield a volume of resistivity of between about $1 \times 10^2 – 1 \times 10^5$ ohm-centimeters.

24 Claims, 9 Drawing Figures

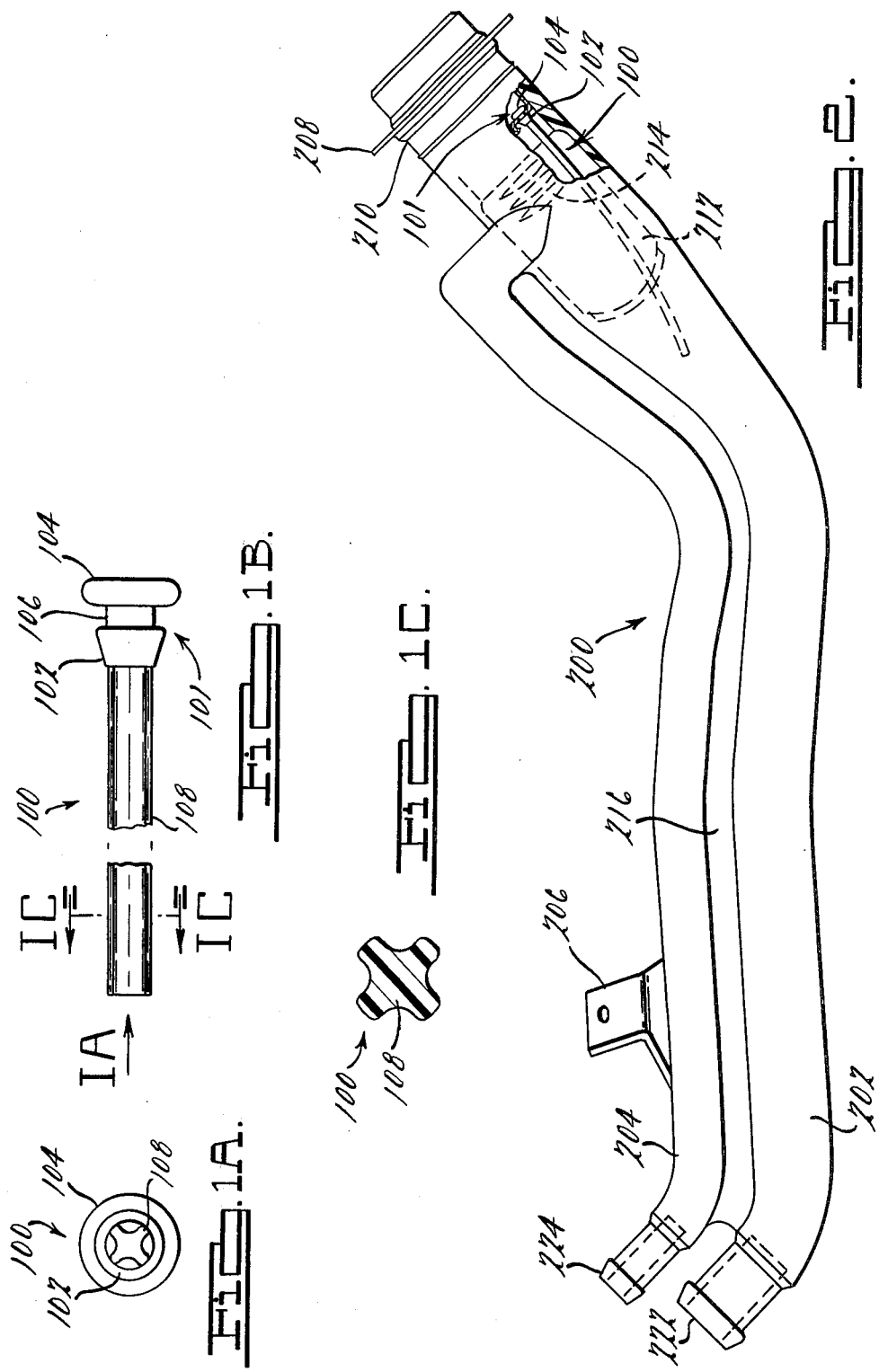

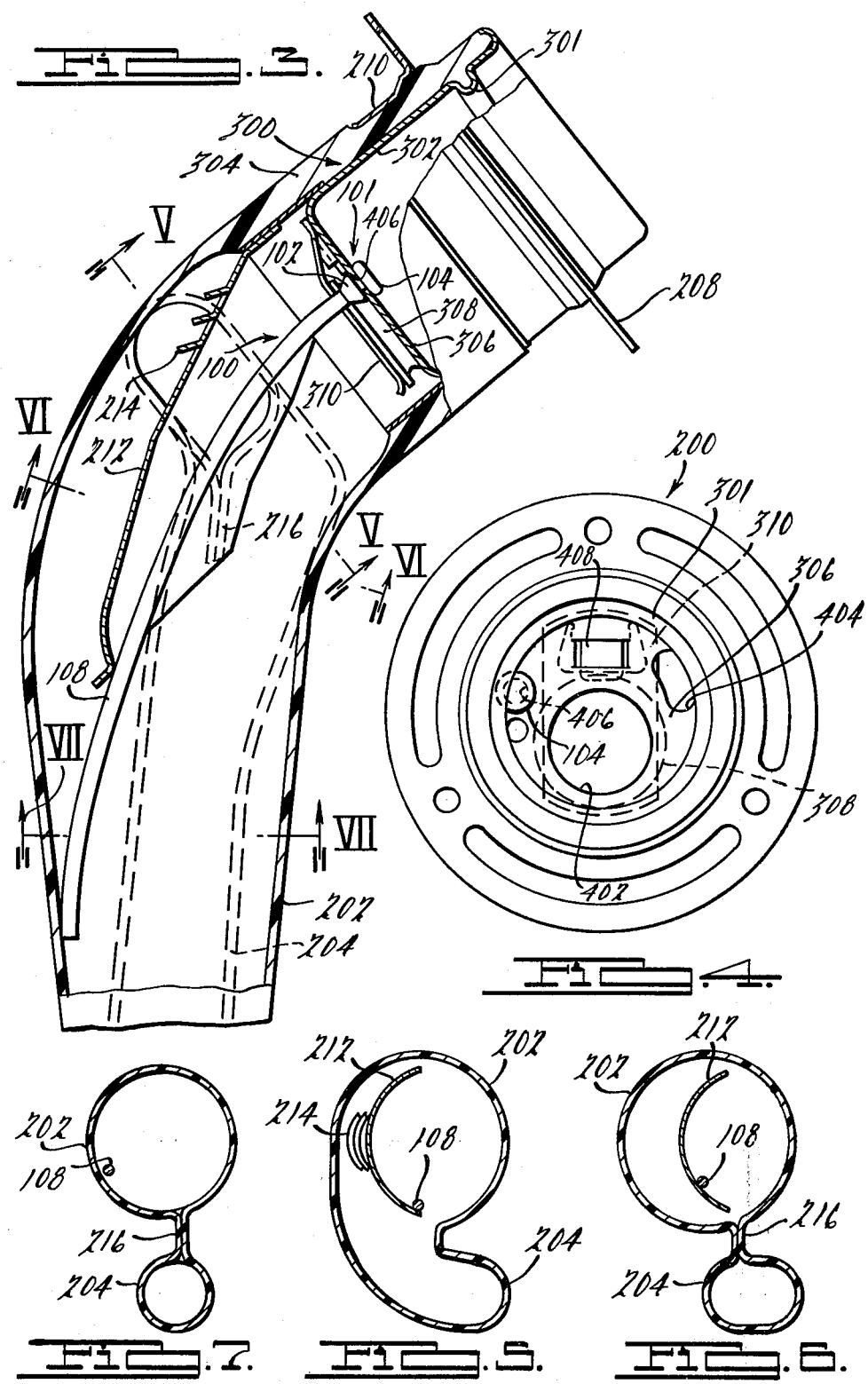

4,319,303

INHIBITION OF CHARGE ACCUMULATION

BACKGROUND OF THE INVENTION

This invention relates to a method of and a means for permitting a flow of hydrocarbonaceous material to pass an electrically insulated conductor susceptible to an accumulation of an amount of electrical charge associable with a contact between the flow and the conductor. This invention, more particularly, relates to an improvement in such method and means.

Semi conductive materials such as plastic semi conductors are known. They have known antistatic properties. In this invention, however, a semi conductor prevents accumulation of an amount of electrical charge on an insulated conductive body. The insulated conductive body otherwise accumulates a higher amount of electrical charge due to contact with a flow of hydrocarbonaceous material past the body.

BRIEF SUMMARY OF THE INVENTION

This invention relates to a method of permitting a flow of hydrocarbonaceous or other such material to pass an insulated conductor otherwise, in absence of this invention, more susceptible to an accumulation of an amount of electrical charge associable with a contact between said flow and said conductor. This invention, more particularly, relates to an improvement of in such method. The improvement comprises preventing an accumulation of a portion of the aforementioned amount of electrical charge by maintaining a semi conductor in electrical contact with the conductor and a portion of the flow downstream from the above noted contact. The semi conductor preferably has a volume resistivity between about $1 \times 10^2$–$1 \times 10^5$ ohm-centimeters at 20° C.; it also preferably extends from an electrical contact with the conductor to an interior portion of the flow of hydrocarbonaceous material. The semi conductor may be made of plastic, preferably the plastic comprises a nylon such as a nylon 12 filled with conductive particulate.

This invention accordingly includes a method of dispensing normally liquid hydrocarbonaceous fuel from an insulated, conductive dispensing means otherwise more susceptible to an accumulation of an amount of electrical charge with a contact between the fuel and the dispensing means. This invention, more particularly, includes an improvement of this method. The improvement comprises preventing an accumulation of a portion of the aforementioned amount of electrical charge by maintaining a semi conductor in electrical communication between (a) a portion of the fuel flowing downstream from the dispensing means and (b) the dispensing means. In this improvement, the semi conductor preferably comprises plastic.

This invention includes an improvement to a plastic fuel filler means. The fuel filler means comprises (a) a hollow, plastic pipe divided into first and second endwise adjoining compartments and enabling transport through the second compartment of a flow of liquid fuel from a fuel dispensing means spout inserted through the first compartment into the second compartment; (b) a restrictor plate dividing the compartments and comprising an orifice through which the spout may be inserted into the second compartment from the first compartment and (c) means for rigidly mounting the restrictor plate in the pipe. The improvement comprises a solid, tubular member, thinner than the plastic pipe, extending from an electrical contact of the spout to a location within the second compartment that carries a portion of the flow of liquid fuel, the member consisting essentially of a semi conductor having a volume resistivity between about $1 \times 10^2$–$1 \times 10^5$ ohm-centimeters at 20° C.

This invention still further includes a fuel filler pipe charge accumulation prevention means. The charge accumulation prevention means comprises a restrictor plate which has (a) an orifice enabling entry of a fuel dispenser spout for permitting a flow of liquid fuel to pass through the spout and the plate while they are in electrical contact with one another and (b) a tubular member mounted to the plate and extending a distance from the plate sufficient to contact the flow of liquid fuel outside the spout wherein the tubular member consists essentially of a semi conductor having a volume resistivity of between about $1 \times 10^2$–$1 \times 10^5$ ohm-centimeters at 20° C.

BRIEF DESCRIPTION OF THE DRAWINGS

FIGS. 1(A), 1(B) and 1(C) show respectively different views of charge accumulation inhibitor 100 of this invention.

FIG. 2 shows fuel filler pipe 200 of this invention. Pipe 200 has a portion cut away to show a portion of charge accumulation inhibitor 100 in elevation.

FIG. 3 shows another view of a portion of fuel filler pipe 200. Pipe 200 has been rotated through an angle of 90° in FIG. 3 from the view of it in FIG. 2.

FIG. 4 is an end view of fuel filler pipe 200.

FIGS. 5, 6 and 7 each show a section of fuel filler pipe 200 taken at V—V, VI—VI and VII—VII, respectively.

DETAILED DESCRIPTION OF PREFERRED EMBODIMENTS

FIGS. 1(A), 1(B) and 1(C), respectively, show end, side and sectional views of charge accumulation inhibitor 100. Accumulation inhibitor 100, shown in FIG. 1(A) from vantage I(A) of FIG. 1(B), has integral shaft 108 and end group 101.

End group 101 has tapered flange 102, plate seat 106 and large flange 104. Shaft 108, as seen from FIG. 1(C), is a flexible, solid, tubular member of fluted cross section.

Charge accumulation inhibitor 100 is made from semi conductive material; accordingly, it serves as a semi conductor. The semi conductive material has a volume resistivity between about $1 \times 10^2$–$1 \times 10^5$ ohm-centimeters at 20° C.

Charge accumulation inhibitor 100 has been injection molded from a semi conductive thermoplastic of aforementioned volume resistivity. The thermoplastic is preferably a filled nylon 12. Examples of such materials are X-3967 and X-4005 in Huls Plastic's "Vistamid-Polyamide 12" brochure bearing a Dec. 12, 1979 date. Conductive carbon black or other conductive particulate imparts semi conductive behavior to the filled nylon.

FIG. 2 shows fuel filler pipe 200. A portion of fuel filler pipe 200 has been cut away. The portion cut away allows a better view of the position of end group 101 of charge accumulation inhibitor 100 in filler pipe 200.

Fuel filler pipe 200 comprises blow molded fuel and vent tubes 202 and 204, respectively. Tubes 202 and 204 have end groups 222 and 224, respectively. End groups 222 and 224 seal fuel and vent tubes 202 and 204, to a fuel reservoir (not shown).

Fuel filler pipe 200 mounts to an autobody through plastic tab 206 and metallic flange 208. Metallic flange 208, crimped to fuel filler pipe 200 at its base 210, has holes to mount it to the autobody. Similarly, tab 206 has a hole for insection of a j-nut or other attachment means to mount it to an autobody.

Within an upper portion of fuel filler pipe 200 is deflector 212; deflector 212 has vents 214. Vents 214 permit a flow of air through deflector 212 from tube 204 to vent orifice 410 (FIG. 4).

Fuel and vent tubes 202 and 204, as mentioned, are blow molded. During the blow molding operation, plastic such as polypropylene also forms web 216 between tubes 202 and 204. The plastic also encapsulates metal filler pipe cap flange retainer 300 as shown more particularly in FIG. 3.

FIG. 3 shows in another view the end of fuel filler pipe 200. Seen in FIG. 3 are fuel and vent tubes 202 and 204, web 216, charge accumulation inhibitor 100 and end group thereof 101, deflector 212 and vents thereof 214, and attachment flange 208 and base thereof 210.

Cap flange retainer 300 comprises a cylindrical portion 302. Cylindrical portion 302 has been encapsulated with the aforementioned plastic during blow molding. A portion of the plastic is shown by plastic section 304. Cylindrical portion 302 together with integral restrictor plate 306 form a cup like metal compartment within fuel filler pipe 200. Cylindrical portion 302 also comprises thread 301. A cap (not shown) may be threaded on 301 to close fuel filler pipe 200.

Restrictor plate 306 has a fuel spout orifice (better seen as 402 in FIG. 4) which has periferial flange 308. Restrictor door mounts to restrictor plate 306; restrictor door 310 also rests, before insertion of a fuel dispensor means spout through orifice 402, against periferial flange 308.

As seen in FIG. 3, charge accumulation inhibitor shaft 108 extends deep into fuel filler pipe 200 through tube 202 and under deflector 212. Also, accumulation inhibitor end group 101 mounts to restrictor plate 306. Inhibitor end group large flange 104 and taper flange 102 are on either side of restrictor plate 306.

During assembly of fuel filler pipe 200, an operator or device inserts shaft 108 through a small hole (inhibitor orifice 406 shown better in FIG. 4) in plate 306. Tapered flange 102 also passes through the hole during this operation. Large flange 104, being bigger than the hole stops the travel of inhibitor 100; seat 106 then rides in the hole. During insertion, shaft 106 travels toward a center portion of fuel filler tube 200 and under deflector plate 214, as is seen more particularly in FIGS. 5, 6 and 7.

FIG. 4 is an end view of fuel filler pipe 200. Restrictor door 310 covers the back side of orifice 402 in plate 306. The back side of orifice 402 has orifice flange 308 upon which a portion of door 310 rests, as mentioned. Door 310 has tab 408; tab 408 has been cut from a center portion door 310. Tab 408 extends through a recess in plate 306. The recess has an opening at top and bottom to receive tab 408.

Plate 306 also has air vent 404; air may pass through vent 404 from fuel filler pipe 200.

Charge accumulation inhibitor flange 104 projects from the surface of plate 306. Seat 106 (FIG. 1) rests in inhibitor seat orifice 406 of plate 306.

FIGS. 5, 6 and 7 are sections of fuel filler pipe 200 taken respectively at V—V, VI—VI and VII—VII of FIG. 3. Charge accumulation inhibitor shaft 108, as can be seen, extends across a portion of fuel tube 202. Fuel passing through tube 202 contacts shaft 108 in its travel to the fuel reservoir.

What is claimed is:

1. In a method of permitting a flow of hydrocarbonaceous material to pass an insulated conductor otherwise more susceptible to an accumulation of an amount of electrical charge associable with a contact between said flow and said conductor, the improvement which comprises preventing an accumulation of a portion of said amount of electrical charge by maintaining a semi conductor in electrical contact with said conductor and a portion of said flow downstream from said contact.

2. A method in accordance with claim 1, wherein said semi conductor has a volume resistivity between about $1 \times 10^2 - 1 \times 10^5$ ohm-cm at 20° C.

3. A method in accordance with claim 1, wherein said semi conductor extends an electrical contact with said conductor into an interior portion of said hydrocarbonaceous material flowing downstream from said conductor.

4. A method in accordance with claims 1, 2 or 3, wherein said semi conductor comprises a plastic.

5. In a method of dispensing normally liquid hydrocarbonaceous fuel from an insulated, conductive dispensing means otherwise more susceptible to an accumulation of an amount of electrical charge associable with contact between said fuel and said dispensing means, the improvement which comprises preventing an accumulation of a portion of said amount of electrical charge by maintaining a semi conductor in electrical communication with (a) a portion of said fuel flowing downstream from said dispensing means and (b) said dispensing means.

6. A method in accordance with claim 5, wherein said fuel comprises gasoline.

7. A method in accordance with claims 5 or 6, wherein said semi conductor has a volume resistivity of between about $1 \times 10^2 - 1 \times 10^5$ ohm-cm at 20° C.

8. A method in accordance with claim 7, wherein said semi conductor comprises a plastic.

9. A method in accordance with claim 8, wherein said semi conductor has a configuration comprising a solid, tubular member.

10. A method in accordance with claim 9, wherein said generally cylindrical shape extends into an interior portion of said fuel flowing downstream from said conductor.

11. In a plastic fuel filler means comprising (a) a hollow plastic pipe divided into first and second endwise adjoining hollow, cylindrical compartments and enabling transport through said second compartment of a flow of liquid fuel from a fuel dispensing means spout inserted through said first compartment into said second compartment; (b) a restrictor plate dividing said compartments and comprising an orifice through which said spout may be inserted into said second compartment from said first compartment and (c) means for rigidly mounting said restrictor plate in said pipe, the improvement which comprises a solid, tubular member, thinner than said plastic pipe, extending from an electrical contact of said spout to a location within said second compartment that carries a portion of said flow of liquid fuel, said member consisting essentially of a semi conductor having a volume resistivity between about $1 \times 10^2 - 1 \times 10^5$ ohm-cm at 20° C.

12. A filler means in accordance with claim 11, wherein said tubular member comprises a filled thermoplastic polymer material.

13. A filler means in accordance with claim 12, wherein said thermoplastic comprises nylon.

14. A filler means in accordance with claims 12 or 13, wherein said filled thermoplastic polymer comprises carbon black.

15. A filler means in accordance with claim 14, wherein said member is solid.

16. A filler means in accordance with claims 11, 12 or 13, wherein said restrictor plate comprises metal.

17. A filler means in accordance with claim 16, wherein said restrictor plate comprises means for receipt of said tubular member.

18. A filler means in accordance with claim 17, wherein said means for rigidly mounting said plate comprises a metal cylinder having said restrictor plate integrally mounted therein.

19. A fuel filler pipe charge accumulation prevention means which comprises a restrictor plate which has (a) an orifice enabling entry of a fuel dispenser spout for permitting a flow of liquid fuel to pass through said spout and said plate while said plate and said spout are in electrical contact and (b) a tubular member mounted to said plate and extending a distance from said plate sufficient to contact said flow of liquid fuel outside said spout, wherein said tubular member consists essentially of a semi conductor having a volume resistivity of between about $1 \times 10^2 - 1 \times 10^5$ ohm-cm at 20° C.

20. A prevention means in accordance with claim 19, wherein said semi conductor comprises thermoplastic polymer.

21. A prevention means in accordance with claims 19 or 20, wherein said semi conductor comprises carbon black.

22. A prevention means in accordance with claim 21, wherein said member has a configuration comprising a fluted, solid cylindrical shape.

23. A prevention means in accordance with claim 22, wherein said restrictor plate comprises a conductor.

24. A prevention means in accordance with claim 23, wherein said restrictor plate comprises a semi conductor having a volume resistivity between about $1 \times 10^2 - 1 \times 10^5$ ohm-cm at 20° C.

* * * * *